United States Patent [19]

North

[11] 4,297,309

[45] Oct. 27, 1981

[54] PROCESS OF USING AND PRODUCTS FROM FUME AMORPHOUS SILICA PARTICULATES

[76] Inventor: John W. North, 1520 Farnell Ct., Apt. 533, Decatur, Ga. 30033

[21] Appl. No.: 162,802

[22] Filed: Jun. 25, 1980

Related U.S. Application Data

[63] Continuation-in-part of Ser. No. 965,233, Dec. 1, 1978, abandoned.

[51] Int. Cl.$^3$ .............................................. C04B 35/14
[52] U.S. Cl. ..................................... 264/56; 264/148; 264/328.1; 264/335
[58] Field of Search ................... 264/86, 56, 148, 335, 264/328; 106/52

[56] References Cited

U.S. PATENT DOCUMENTS

| | | | |
|---|---|---|---|
| 2,047,457 | 7/1936 | Benner | 264/56 |
| 3,163,688 | 12/1964 | Lindenthal | 264/56 |
| 3,873,658 | 3/1975 | Milholen | 264/148 |

*Primary Examiner*—John A. Parrish
*Attorney, Agent, or Firm*—Newton, Hopkins & Ormsby

[57] ABSTRACT

Amorphous silica particulates, known as fume silica, which are generally spherical and of small particle sizes, are recovered from the stack gases issuing from an electric furnace producing silicon metal by the reduction of silica with carbon, and these fume silica particles are mixed with up to 40% water to produce a fume amorphous silica green product which is a plastic which may be compacted, such as being extruded, to produce batts or pellets or other shapes. The batts or pellets are sealed in plastic film or in cans and shipped or stored. The batts or pellets are subsequently shaped to prescribed shapes under pressure, dried and, at times, fired. The particulate amorphous silica and water material is, at times, compacted, dried and then shipped or stored. Such dried material is crushed and partially pulverized either before shipment or at the point of use and reconstituted by the addition of water. The fume silica is also mixed with water and a consumable filler or foaming agent and fired to produce a cellular product. The various products are machinable both before and after firing. A mixture of the fume silica and water does not settle out on standing or vibrating and is combined with colloidal silica and dried and ground silica for producing an adhesive silica product suitable as a refractory cement, a refractory facing plaster, a refractory joining mortar or as a slurry for a dip coat for a ceramic shell foundry mold or a shell for investment casting.

45 Claims, No Drawings

PROCESS OF USING AND PRODUCTS FROM FUME AMORPHOUS SILICA PARTICULATES

CROSS REFERENCE TO RELATED APPLICATION

This is a continuation-in-part of my copending application, Ser. No. 965,233, filed Dec. 1, 1978, abandoned for PROCESS AND PRODUCT FROM STACK GAS RECOVERED AMORPHOUS SILICA PARTICULATES ISSUING FROM AN ELECTRIC FURNACE PRODUCING SILION.

BACKGROUND OF THE INVENTION

1. Field of the Invention

This invention relates to amorphous silica product and process and is more particularly concerned with a process of using and products from fume amorphous silica particulates usually recovered from an electric furnace which produces metallic silicon.

2. Description of the Prior Art

In the past, amorphous silica slips have been produced by grinding in a ball mill, conventional amorphous (fused) silica and water. Such prior art amorphous fused silica was produced by melting sand or other quartz crystals. Such silica, when ground with water formed slips which were then cast into prescribed shapes which were then dried and fired. The grinding operation was necessary in order to activate the surface of amorphous fused silica sufficiently to capture and retain the water and cause bonding at the millions of contact points of the extremely fine particles when the slip was dried. When amorphous fused silica is ground dry, and then water added, the mixture does not bond to any appreciable extent and will not produce a useful product.

The U.S. Patent to Lindenthal U.S. Pat. No. 3,163,688 is typical of this prior art and shows preparing slip by grinding fused silica with water. As a practical matter, the major fabricators use about 17% water rather than Lindenthal's 28.57%, and grind perhaps ⅓ as long. This uses less power, with less capital tied up in equipment, and results in faster casting of the silica when poured into plaster of paris molds to cast into shapes. The slip castings are made for various end uses, usually with the addition in the slip of silica glass grains of sand like size and shape, up to 4 mesh size. This makes possible thick and complex castings.

Foam insulating blocks are being made from this slip by a very careful mixing, with a foam, such as firefighting foam, of water and proteins or special alcohols then cast in plaster molds. This takes many molds and much space and time. I tried to make these blocks by adding sawdust, wood flour, nut shell or peanut shell particles to the above slip, to be burned out in firing. Extrusions using the slip were not successful, and slip cast and pressed blocks cracked and are weak after firing.

The patent to Berner U.S. Pat. No. 2,047,457 teaches a procedure which is typical of the prior art efforts to impart plasticity to fused silica slip.

The slip produced from the prior art process is "dilatent" and does not lend itself to conventional clay shaping. Instead, it is usually cast.

It has, heretofore, been asserted in literature from the manufacturer that the fume silica stack particulates are "pozzolanic" and it has been suggested by such literature that such particulates be incorporated into concrete along with Portland cement to improve the properties of the concrete. I have found, however, that a block of fume silica, without the Portland cement is not pozzolanic, in that dried and unfired shapes of fume silica alone have low strength and will soften when wet.

The fume silica, i.e., the spherical amorphous silica stack particulates, and water mix of the present invention produce a plastic, rather than dilatent, product which is quite versatile and may be formed by dry pressing, ramming, extrusion, injection molding, potters wheel shaping or jiggering and may be machined either when partially dry or after firing.

The process of the present invention eliminates the necessity of (1) fusing quartz crystals and (2) grinding the resulting glass in water.

In the prior art a so-called "cement" is used as mortar and sometimes as a plaster facing for fused silica products, especially the foam block or insulating brick. This cement is made by mixing the fused silica slip of the prior art with silica glass grains and colloidal silica in water suspension. The cement is almost universally mixed at the silica fusion or fabrication plant and shipped to the point of use. With the vibrations of shipping, most of the solids in the cement settle out and form a hard cake which must then be remixed by prolonged rolling or tumbling or other tedious procedure.

This has not been avoided by delaying the mixing until after shipping, as the slip alone has the same settling problem.

SUMMARY OF THE INVENTION

Briefly described, the present invention includes mixing, with up to 40% water, a particulate of amorphous silica and incidental small amounts of carbon, known as "fume silica" or "spherical silica" which is recovered from the stack gases of an electric furnace producing silicon metal by the reduction of silica with carbon. The better accepted name for this silica is "fume silica," rather than "spherical silica" even though both terms are used. The mixture of fume silica and water is compacted, such as being extruded, to produce batts or pellets. The batts or pellets are sealed in closures such as plastic film or cans and shipped or stored. The batts or pellets are subsequently shaped to prescribed shapes under pressure, dried and, at times, fired. The fume silica and water material is, at times, compacted, dried and then shipped or stored. Such dried material is, thereafter, crushed and partially pulverized, either before shipment or at the point of use and reconstituted by the addition of water.

The fume silica material being surprisingly plastic, rather than dilatent, is processed using conventional clay processes, such as dry pressing, ramming, extrusion, injection molding, potter's wheel shaping and jiggering and may be machined either when partially dry or after firing the mixtures of fume silica and water. At times a consumable filler or fire-fighting foam type foam is combined with this plastic slip and, when fired, results in cellulated products.

A mixture of the fume silica and water does not settle out on standing or vibrating and, when combined with colloidal silica and dried and ground silica, produces an adhesive silica product suitable as a superior refractory cement, a refractory facing plaster, a refractory joining mortar or as a slurry for a dip coat for a ceramic shell foundry mold or a mold for investment casting.

DETAILED DESCRIPTION

In more detail the present invention includes obtaining the particulate material (fume silica) from the stack gases of an electric furnace, which is producing metallic silicon by reducing silica with carbon, coke or charcoal. These particulate materials are essentially amorphous silica with about 0.1% to 10% elemental carbon and from 0.01% to 1% iron and typical samples have a particulate size distribution of about 10% from 5 microns to 0.7 microns, about 35% at 0.4 micron to 0.7 microns and about 55% under 0.4 microns. There is considerable variation in chemical content and particle size from plant to plant and from time to time, as these things are not of prime concern to the silicon metal smelter. The amorphous i.e., non-crystaline, silica particles (fume silica) are spherical in shape, whereas the particles of conventional silica made amorphous by fusion and pulverized, appear, under a microscope, to have the characteristics of crushed stone with irregular shapes and sharp points and edges.

The fume amorphous silica appears to have been produced by silicon monoxide gas (SiO) reoxidizing to yield silicon dioxide ($SiO_2$) in an amorphous spherical form. Fine carbon particles are caught up and mixed with the silica.

The particulate material from the stack gas is now required, by government regulations, to be removed from the stack gases before the gases are discharged to the atmosphere and are currently being collected and have a density of about 14 pounds to 28 pounds per cubic foot. Thus, the bulk precludes the economical shipment of this material.

I have found that by admixing this spherical or fume amorphous silica material with water to constitute up to 40%, by weight, water in the resulting mixture, the material can be compacted to a density of from about 4 to about $7\frac{1}{2}$ times the density of the recovered spherical or fume amorphous silica particulate material and up to about 110 pounds per cubic foot. Thus, the bulk is materially reduced and, therefore, the cost of shipping is very materially reduced. The resulting compacted mixture is quite plastic, as opposed to being dilatent, and can be processed in the same manner as a conventional green clay plastic mix.

While various mixing devices, such as a ribbon mixers, mullers, dry pans or wet pans, may be employed for mixing the fume silica material and water, I prefer, when the consistency is either stiff mud or soft mud to employ a pug mill equipped with a deairing chamber and an extruder to thoroughly admix the material and water and extrude the same as a continuous strip or cake which is then cut into batts.

If desired, the material can be compacted in other ways, such as by extruding in ribbons or as small rods which are chopped into pellets or nodulated.

When the moisture content is relatively low, below that which will produce stiff mud, I prefer to employ a muller for mixing the particulate material and water, and thereby produce pelletized or nodulated green products.

Specially sized billets of the green product, such as squares or rectangles, proportioned for a particular die, can be produced if desired. Briquettes may also be produced from the green product.

When produced, the admixed green product of fume silica and water, is placed in a hermetically sealed container or closure, such as in a plastic film bag, the open end of which is closed, preferably by heat sealing, or in a sealed metal can which is then stored or shipped. The green product is then maintained in a plastic condition so that, when the bag or can is opened, it can still be processed, according to conventional clay processing techniques. The solids therein do not readily settle out.

The dry or semi-dry green product, which usually contained less than about 15% moisture, is subjected to dry pressing into prescribed shapes through the application of from about 300 psi to about 30,000 psi, at room temperature. Such shaped and compacted products are then fired at a temperature of from about 1400° F. to about 1800° F. At times, the dry pressed green product need not be fired, since it may be fired in use, such as when it becomes part of a furnace.

The green product, as a mud (usually containing from about 15% to about 25% moisture) is suitable for producing refractory brick or building brick. This is done by placing the green product in an extruder and then cutting the progressively extruded cake to length as it emerges therefrom. The individual green bricks can, if desired, be repressed to more complex forms. Such green brick products are then fired from about 1400° F. to 1800° F.

It may be found desirable to dry the green product before shipment or before it is to be used. In such a situation, a damp mix is made, as in a muller, and it tends to agglomerate in mixer and dry as a mixture of various sized modules or pellets. Pug mill extrusions may also be dried and crushed to give a similar mixture. The nodules will not readily and completely disintegrate when rewetted, but a portion of dried material may be broken down to give enough very fine material to bond the coarse particles, or fresh fine material added, when re-wetting to use the dried material.

In the drying it is not necessary or desirable to heat above about 200° C., and thus the bonding effect of the fume silica is not lost. The contact points for bonding must be supplied by sufficient fines to fill the voids between the nodules. Grinding the nodules to this extent, in a hammer mill or ball mill for example, is a fast and inexpensive way of dispersing the silica, because the dried agglomerates are much softer than the fused silica of the prior art.

When shaped articles or bricks are fired at 1400° F. to 1800° F. for a short time they are amorphous and have low thermal expansion comparable to fused silica, about 0.0000006 to 1 per °C. In the brick form, for service at high temperatures in lieu of the silica bricks of the prior art, the bricks may be crystallized by long firing at high temperature.

It is advantageous in most cases to install the fume amorphous silica brick, which will expand very little in the first heat-up of the furnace or kiln. As the silica crystallizes from time and temperature it becomes more like brick of the prior art.

It will be understood that the fused amorphous silica is in a peptized condition, i.e., bondable by water, when it is recovered from a stack and remains so when it is initially mixed with water and dried, or dried and ground. The peptized condition is lost progressively when the fume amorphous silica is heated to a high temperature, such as above about 400° F. Thus, in order to produce a useful product, the fume amorphous silica-water mixture need not be kept moist. The extrusion from the pug mill, for example, will produce the green cake which is cut to length and used or packaged, moisture tight, for storage or shipment, or shipped dry before or after being crushed and partially ground to a mixture of primary particles and various sized agglomerates. The silica crushed before shipment may be reconstituted by adding water and mixing. Silica, not sufficiently crushed after drying may be further ground, dry before adding water, or the water added before or during the grinding. In either case it is not necessary or desirable to break up all the agglomerates, as the presence of agglomerates as coarse grain or grog tends to reduce drying, shrinkage and cracking.

Furthermore, a slip may be made of a green mixture of the spherical or fume amorphous silica material and water. Such a slip should contain from about 25% to about 40% water. Course dry agglomerates of amorphous silica may, if desired, be added to the slip, during or just prior to the casting, to help the slip harden by loss of water to the dried agglomerates.

The addition of coarse dry agglomerates of the fume silica particles, from 1% to 80% by weight of solids, reduces drying shrinkage.

In the prior art of making slip by grinding conventional fused silica with a minimum water amount of water, the pH is sometimes found to vary, due perhaps to impurities or to fineness of grinding, and may affect casting times and qualities of the castings.

The pH and other effects are routinely monitored and the pH adjusted, if desired, by the addition of acids or bases in minute quantities. Usually a pH of about 5 is desirable. Those versed in the ceramic arts will recognize this technique as similar to the prior art "defloccu-lation" of clay slips to give the desired viscosity with a minimum of water content.

In the prior art, the majority of the slip castings were made by adding glass grains of sand or gravel size to the silica and water. This made it impractical to machine the shapes in the dried or fired states, due to the hard grains breaking out rather than being cut. In my process the dried agglomerates, added or found in reconstituted dried slips, do not cause these relatively hard spots. Thus, the piece may be machined after partial or complete drying or after firing. Even with wood chips or paper fiber added, the fired or unfired castings can be machined.

Bricks or other shapes produced by fume silica may be converted to crystalline silica, such as cristobalite and/or tridymite, by heating them above 1800° F. to about 2700° F. The heating may take place in service or in manufacturing the bricks. The proportions or cristobalite to tridymite are not important, as their densities at service temperatures are very similar.

I have also made insulating block of fume silica by mixing sawdust and/or newspaper and water with fume silica, so that the sawdust and/or newspaper fiber is from 1% to 65% of the solids content. The water content, as a practical matter, is adjusted to give a mud of the stiffness that works best in the mixing and extruding apparatus and for the mix being used to get the desired fired density.

Old newspapers, or newspapers ground as for house insulation and found in nodules, may be mixed with water, but it is difficult to break up the lumps and disperse the individual fibers. There has been considerable work with wood and mineral fibers where paper making beaters do this dispersion, in an excess of water, and the excess water filtered out to make boards from a clay and fiber mix on a paper making machine. Dispersion of the paper can be accomplished this way, prior to the paper being mixed with the silica and water.

I prefer to mix either fume silica or clay with newspapers, or with nodules of paper or mineral fibers. Regardless of the order of mixing, a double shaft paddle mixer, a muller, pug mill or similar intensive mixing device will disperse the newspaper to individual fibers within one to 10 minutes in a sticky and plastic mud of some stiffness. The surface fibers of a ball of paper or fiber seem to stick to the mud and be pulled off by the pulling and shearing action. This progresses rapidly until dispersion is complete. A single shaft paddle mixer will have this effect.

The mixture, of clay or fume silica, can be extruded, rammed, pressed, cast, or injection molded. Bars, tubes, blocks, etc. may be dried and/or fired and stocked for machining into parts where the short runs are being processed.

In making large shapes, such as large slab castings of fume silica, the product has a noticeable shrinkage and a tendency to crack on drying. The cracking tendency is greatly reduced or eliminated by adding to the mix, up to 5% by weight of old newspapers. Usually about 1% to 2% by weight of the fume silica mix is sufficient.

When the slab is made less dense by adding sawdust for burning out, the sawdust serves somewhat the same purposes, but adding newspaper in addition gives much better results.

It is preferable to use part of the water to wet the newspaper in wads. Part of the water and fume silica should be used to make a soft mud. Add wet paper and dry fume silica gradually thereto so that the paper wad does not get a hard shell of silica thereon. The sticky mud will thus abrade out individual cellulose fibers until the wads are broken up and dispersed.

A better understanding of my invention will be had by reference to the following examples:

EXAMPLE I 68 pounds of fume silica, containing about 5% carbon, as received 32 pounds of sawdust (passed through a 10 mesh screen) and 13 pounds water in which was dissolved 3 grams of NaOH were mixed together using a double shaft kneading mixer. (The water may be varied to compensate for variations in the sawdust used or to suit the apparatus).

The mixture was cast, extruded, rammed, and pressed to make various blocks and cylinders and then dried and some were fired at 1600° F. The shapes maintained their integrity in both drying and firing and were crisp and strong. Density was about 40 lbs. per cubic foot. Drying shrinkage was under 10% (linear), and firing shrinkage negligible.

It is noted that the NaOH addition was determined by trial to obtain the minimum water content for the workable mud.

EXAMPLE II 100 pounds of fume silica, containing less than 1% carbon 2 pounds of old newspapers and 30 pounds water were mixed in a double shaft kneading mixer. (The water may be varied to suit apparatus).

Articles were extruded, cast and rammed using this mixture, then dried and some were fired at 1600° F. Some pieces were turned on a lathe in the dried state, others turned in the fired state. Pitting was observed due to air bubbles, in the cast articles. However no pitting was observed in the de-aired extruded articles. Otherwise the products were machined in a smooth and clean fashion when dried or fired. Masonry blocks 4"×10"×48" were cast, dried and fired, successfully.

Using conventional fused silica, such large size blocks are usually made by grinding the fused silica and water slip, and adding coarse grains of silica glass to the slip before casting. The resulting product is difficult to machine, as pointed out above.

Another method of molding articles with low shrinkage according to the present invention, is by the drying, recrushing and regrinding methods, previously discussed. The coarse grains of fume silica left unground take the place of coarse glass paticles in the prior art to minimize drying shrinkage. These coarse grain fume silica particles are easily cut by machining tools which leave smooth cuts.

A typical glass melting furnace roof for service at about 2600° F. to 2800° F. in the prior art is built of silica brick of commerce. This silica brick is commonly made by binding quartzite sand with lime and firing the product to about 2600° F. to 2800° F. for 24 to 72 hours. This converts the quartz crystals to cristobalite and tridymite, which mixture has a melting point about 200° F. higher than that of quartz, and has less tendency to sag at temperatures up to about 1900° F. Fume silica brick could be used with less concern for expansion during heat-up. The brick would then crystallize when subjected to high enough temperatures in service.

An amorphous (fused silica) brick of the prior is often used to patch a hot spot in the roof of a kiln, without shutting down the kiln, because the fused silica will not spall or crack when suddenly exposed to the heat. The brick then crystallizes in service in so far as the high temperature soaks into the brick. There is no problem of thermal expansion failure during the crystallizing, because above about 600° F. the specific volume of the amorphous silica and the crystalline silica are the same. Fume silica brick will serve the same purpose.

I have built a cubically shaped kiln of amorphous silica blocks about 5 feet square, 6 blocks making the 6 sides of the cube. The blocks were about 6" thick. There was no cementing or steel framing used, as there was no detectable movement resulting from expansion. The kiln after being used at various temperatures for more than one year, was found to be crystallized about one-fourth way through the thickness, without failure or apparent shifting of the blocks.

In the prior art, a comparable kiln would have been brick, the roof would have been arched, and a heavy steel framework would have restrained it against thermal expansion and the thrust of the arch.

As described above, the prior art fused silica cement has settling problems and, at times, must be remixed. Such settling can be avoided using my procedure described as follows:

With fume silica, the water and silica mixture, is mixed to a stiff mud consistency that will not settle out in shipment. Hence, the user has only to take the desired quantity and stir in the colloidal silica to the best working consistency for the cementing mortar. To minimize coarse cracking in a plaster face, glass grain may be added as the mix is stirred. In lieu of the glass grains fume silica pellets of similar size may be added, the pellets being obtained from grinding dried or partially dried fume silica castings, or extrusions obtained from a pelletizing apparatus. The added fume silica aggregates are preferably dampened with water before mixing.

A simpler way to make the cement is to grind dried cakes or pellets of fume silica to the optimum particla size, adding untreated powder if needed for fineness of particle size. This is dampened or wet as needed before adding the colloidal silica.

The most commonly used colloidal silica has an average particle size of 12 millimicrons, about 40% silica, and is stabilized with sodium hydroxide to a pH about 9.7.

In the prior art is a mixture of colloidal silica and fused silica particulates which is used as a protective coating in cast iron molds for casting steel ingots. Similar mixtures are used in making investment casting and ceramic shell molds for casting metal parts. Such prior art mixtures appear to have solids which settle out.

I have found that by combining with a mixture of fume silica, water and colloidal silica, dried and ground fume silica agglomerate, having a controlled particle size distribution a superior refractory product can be produced which does not settle appreciably upon standing or with vibration. These agglomerates or particulates are dampened as necessary to prevent premature gelling, and mixed in their dampened condition with the colloidal silica. My method is cheaper. It also gives a lighter density, which may or may not be desirable.

Specific examples of refractory product suitable as cement, facing plaster, joining mortar, lost wax investment molds and a refractory coating made according to the present invention are as follows:

EXAMPLE III 100 parts fume silica and
10 parts water
were mixed together and, thereafter 25 parts of colloidal silica were mixed into the mixture to provide a joining mortar. Two firebricks, each 9 inches by 4½ inches by 2¼ inches, were joined along their 9"×2½" sides with this mortar or cement. The mortar joint thickness between the two bricks was about 1/16 inch. The bricks and mortar were dried at 110° F. When dry, the mortar held the two bricks together, as they were dropped three times from a height of 24 inches onto a concrete floor.

EXAMPLE IV

The cement produced according to Example III was used as a facing plaster, ¼ inch thick on foam silica block. It showed visible cracks on drying.

To remedy this, fume silica agglomerates of a size 100% through a 20 mesh screen and 50% through a 100 mesh screen were obtained by crushing a dried block of fume silica and selectively screening the particles. These screened particles or agglomerates were then dampened in appearance and feel by adding about 10 parts water to 100 parts of the particulates. Twenty parts of these particulates were added to a previously mixed mud mixture containing 100 parts fume silica, 10 parts water, and 25 parts colloidal silica. This resulting cement trowelled readily, stuck to the foam brick and, upon drying, had no significant cracks visible to the naked eye.

EXAMPLE V

For producing a shell mold for casting metal therein, a fume silica extrusion was made by mixing 100 parts fume silica and 25 parts water. This was extruded as a 1½ inch diameter rod, cut to 6 inch lengths. The 6 inch rods were dried at room temperature and then crushed. Through selective screening, particulates were obtained having a particle grain size distribution by weight, as follows:

1% +200 mesh
5% −200 to +325 mesh
94% −325 mesh

To 100 parts of these particulates, 10 parts of water were added to dampen them. Then 33 parts of colloidal silica and 0.1 part an anionic wetting agent (dishwashing detergent) was stirred gently with the particulates to avoid entraining air therein to produce a "slip."

A wax block pattern was dipped into this slip to produce a wet coat thereon and then the coat was stuccoed by throwing grains of dried and crushed fume silica, having a size distribution of from −50 to +100 mesh, against the coating on the block to build up its thickness.

The assembly was air dried for one day, and the process repeated, using a dip of the slip, followed by a coarser grain stuccoing sized −20 to +50 mesh.

The assembly was air dried and then placed in a 1,000° C. furnace to melt, drain and burn out the wax.

The resulting hollow mold had a smooth inner surface with a contour of the wax block pattern and was suitable for receiving molten metal to produce a smooth surface coating.

In producing metal castings in metal molds, a coating produced from fume silica, water and colloidal silica for coating to the surfaces defining the casting cavity will permit molten metal to be received in the mold, without damage to this surface. More specific information is contained in Example VI.

EXAMPLE VI

For coating cast iron molds for steel ingots, a mixture of water and fume silica was made as in Example III.

I then mixed 100 parts, by weight, of fume silica dried agglomerates in sizes 90% through 100 mesh and dampened to feel, and 20 parts, by weight, colloidal silica.

This mixture was poured on cold iron and on iron which had been heated to 125° C. It adhered to the iron in each case and formed a coating about 1/16 inch thick, thereon.

In the procedure of Examples V and VI, the moisture of or wetting of the fume silica before being mixed with colloidal silica minimizes the penetration of the colloidal silica into the crevices or interstices between particles, thereby reducing the amount of expensive colloidal silica used. During firing, the water will be released as water vapor or steam, leaving the essentially silica solids residue.

Since fume silica, today is less expensive than the manufactured fused silica, the resulting silica product i.e., the cement, the shell or coating, are each less expensive than conventional cement, shells or coating, heretofore used.

For 100 parts of the dried and ground silica grain or particulates, up to 20 parts water and up to 30 parts colloidal silica can be used for producing the refractory cement facing, mortar, slip or dip. Sufficient colloidal silica is usually employed to made the resulting mix "sticky."

EXAMPLE VII 100 parts, by weight, fume silica
20 parts, by weight, water were mixed together, to form a basic mix, a part of this basic mix was then extruded as a rod which was cut to lengths and dried. This dried mixture was ground to produce silica grain. Next:

100 parts, by weight, silica grain
10 parts, by weight, water were mixed so as to dampen the silica grain and produce grain mix.

An adhesive slurry was produced by combining 20 parts, by weight, colloidal silica and 100 parts, by weight, with the basic mix, to which was added 100 parts, by weight, grain mix.

The resulting slurry is suitable for as a refractory product for patching cement, facing mortar, adhesive mortar for joining refractory blocks or as a mold material for shell molding.

The basic mix can be varied in Example VII, by using from about 5 parts to about 25 parts, by weight, water per 100 parts fume silica, i.e., solids.

The grain mix can contain up to about 20 parts water per 100 parts grain. The amount of grain mix used to produce the slurry can be up to about 200 parts, by weight, grain mix per 100 parts, by weight, basic mix.

The colloidal silica of the slurry may be from about three parts to about 40 parts, by weight, colloidal silica per 100 parts of combined basic mix and grain mix.

The silica grain can be either dried and ground or "fired" and then ground. The distribution of sizes of the grain is so as to provide close to maximum density of pack is desirable, as is common in ceramic work, but this is not mandatory. The maximum particle size is governed by the texture and workability preferred.

For the first dip coat for lost wax casting in metal foundries, a 90% under 325 mesh and 100% under 200 mesh size gives good results, but the sizing may be varied to suit the user's preference.

For patching, mortar, facing coats, etc. with fume silica insulating block, the grain would be commonly −50 mesh or −20 mesh.

For a wash on ingot molds to receive steel, the grain may be about 20 mesh, but the sizing is not mandatory.

The mixing procedure of adding the colloidal silica and for the grain may be completed by the purchaser at the point of use, or it may be completed before shipment.

Even if mixing is completed before shipment, settling out is only partial and the batch may be readily stirred to restore its uniformity of mix.

This is a distinct advantage over the prior art, in which the fused silica cement and mortar settles out in shipment and must be remixed with considerable labor and equipment involved. If the ingredients are shipped separate, the solids will settle out of the slip of the prior art which is used in the mix. In the case of mold coatings, a common prior art procedure is to use all dry grain and powder to mix with colloidal silica and this requires a larger proportion of colloidal silica liquid, which is expensive.

In addition to the variations shown above, an adhesive slurry may be made with 100 parts grain mix and from 10 to 100 parts colloidal silica, to which may be added from zero to 100 parts of the basic mix.

EXAMPLE VIII

As a dip coat for wax patterns a silica grain was produced by mixing 100 parts, by weight, fume silica, 35 parts, by weight, water which was dried as a cast sheet at above 200° F. The sheets were broken and tumbled in a ballmill with porcelain balls until sized as follows:

1% +200 mesh
5% −200 to +325 mesh
94% −325 mesh

Next, 100 parts of this dried and ground silica grain was mixed with 10 parts water to which was added 23 parts by weight colloidal silica, which was sodium stabilized, 40% solids, 12 millimicrons in size.

EXAMPLE IX

The procedure of Example VIII was followed except that the silica grain was coarser, having the following distribution:

5% +200 mesh
95% −200 mesh

The resulting slurry was suitable as a mold coating material.

It will be obvious to those skilled in the arts many variations to be made in the embodiments here chosen for the purpose of illustrating the present invention without departing from the scope thereof as depicted in the appended claims.

I claim:

1. Process of producing an amorphous silica product comprising:
   (a) mixing fume amorphous silica material and water to produce a plastic mixture wherein said silica material consists essentially of stack gas particulate issueing from an electric furace producing silicon metal by the reduction of silica with carbon;
   (b) shaping said plastic mixture into a prescribed shape; and
   (c) drying the shaped plastic mixture.

2. The process defined in claim 1 wherein the step of shaping said mixture includes compressing the same.

3. The process defined in claim 2 wherein said water constitutes less than 15% of the mixture and wherein said compressing includes applying from about 300 psi to about 30,000 psi pressure to said plastic mixture.

4. The process defined in claim 1 wherein the step of drying the shaped plastic material includes firing the same to a temperature of up to about 1,800° F.

5. The process defined in claim 1 wherein said water constitutes up to about 40% by weight of said plastic mixture.

6. The process defined in claim 1 wherein said shaping includes extruding said plastic mixture.

7. The process defined in claim 6 including the step of progressively cutting to length the extruded material.

8. The process defined in claim 7 including drying said extruded material, grinding the dried material and mixing the ground material with water to reconstitute the same as a plastic mix.

9. The process defined in claim 1 wherein the step of shaping said plastic mixture includes reshaping a plastic bat by pressing it in a die.

10. The process defined in claim 9 wherein the said water constitutes from about 15% to about 25% of said plastic mixture.

11. The process defined in claim 1 wherein said fume amorphous material and said water constitutes essentially the entire plastic mixture.

12. The process defined in claim 11 wherein said water constitutes up to about 40% by weight of said plastic mixture.

13. The process defined in claim 1 wherein the step of shaping said plastic mixture includes injection molding said mixture.

14. The process defined in claim 1 wherein the step of shaping said plastic mixture includes shaping said plastic mixture on a potter's wheel.

15. The process defined in claim 1 wherein the step of shaping said plastic mixture includes jiggering.

16. The process defined in claim 1 wherein the step of shaping said plastic mixture includes extruding said plastic mixture and producing batts from the extruded mixture.

17. The process defined in claim 16 wherein the step of shaping said plastic mixture includes producing a plurality of rods from said plastic mixture.

18. The process defined in claim 17 including chopping said plastic rods.

19. The process defined in claim 1 wherein the step of shaping said plastic mixture includes producing pellets therefrom.

20. The process defined in claim 1 wherein the step of shaping said plastic mixture includes producing briquettes.

21. The process of producing an amorphous silica product comprising:
   (a) mixing fume amorphous silica material in water to produce a plastic mixture wherein said silica material consists essentially of stack gas particulate issuing from an electric furace producing silicon metal by the reduction of silica with carbon;
   (b) extruding said plastic mixture;
   (c) reducing said plastic mixture to smaller shapes and confining said smaller shapes in a closure.

22. The process defined in claim 21 wherein said smaller shapes are batts.

23. The process defined in claim 21 wherein said smaller shapes are nodules.

24. The process defined in claim 21 wherein said smaller shapes are pellets.

25. The process defined in claim 21 wherein said closure is a plastic film container.

26. The process defined in claim 21 wherein said closure is a metal can.

27. The process defined in claim 1 wherein the dried plastic material is ground in admixture with water.

28. The process defined in claim 1 wherein the shaped plastic mixture is reshaped to a different configuration prior to drying.

29. The process defined in claim 1 wherein the step of shaping said plastic material includes extruding, cutting the extruded plastic mixture to smaller sizes and thereafter reshaping the smaller sized plastic mixture.

30. The process of producing an amorphous silica product comprising:
   (a) mixing fume amorphous silica material in water to produce a plastic mixture wherein said silica material consists essentially of stack gas particulate issueing from an electric furace producing silicon metal by the reduction of silica with carbon;
   (b) compacting said plastic mixture; and
   (c) packaging said compacted plastic mixture.

31. The process defined in claim 30 wherein the density of the compacted plastic mixture is from about 4 to 7½ times the density of the fume amorphous silica material.

32. The process defined in claim 1 wherein the step of shaping includes extruding said material as a rod.

33. The process defined in claim 1 wherein the step of shaping includes extruding said material as a tube.

34. The process defined in claim 1 including grinding the dried shaped plastic mixture to produce ground material and mixing the ground material with water to reconstitute the same as a plastic mixture.

35. The process defined in claim 1 including mixing combustible particles with said amorphous silica material and said water prior to shaping said plastic mixture, and wherein the step of drying the shaped plastic mixture includes firing said shaped plastic material to a temperature and for a sufficient length of time to consume the combustible material.

36. The process defined in claim 35 wherein said combustible particles are selected from the group consisting of wood flour, saw dust, nut shells, peanut shells and a mixture thereof.

37. The process defined in claim 1 including mixing fibrous materials with said plastic mixture, prior to shaping the plastic mixture.

38. The process defined in claim 37 wherein said fibrous material is selected from the group consisting of paper and mineral wool fibers.

39. The process defined in claim 37 or 38 wherein said fiberous material is admixed with said amorphous silica and said water in a bulk condition and the mixing includes sufficient agitation of the mixture to disperse the fibers of said fibrous material in said amorphous silica and water.

40. The process defined in claim 1 including machining the dried mixture.

41. The process defined in claim 1 wherein the step of shaping said plastic mixture, includes forming the plastic mixture into bricks or masonry block and the step of drying the shaped plastic mixture includes firing the shaped plastic mixture to a temperature sufficiently high to convert the amorphous silica to crystalline silica.

42. The process defined in claim 41 wherein the firing of said plastic material includes producing a kiln from the masonry block or bricks and then firing said kiln for converting the exposed surfaces on the inside of said kiln to the crystalline silica.

43. The process defined in claim 41 or 42 wherein said crystalline silica is cristobalite and/or trydymite.

44. The process defined in claim 1 including mixing a pregenerated foam with said amorphous silica material and said water prior to shaping said plastic mixture; and wherein the shaped plastic mixture has cellular voids.

45. A process of producing an adhesive fume silica product comprising:
  (a) initially admixing fume silica and water to produce a slurry wherein said silica material consists essentially of stock gas particulate issuing from an electric furnace producing silicon metal by the reduction of silica with carbon;
  (b) maintaining said slurry with its solids in suspension for a period in excess of one day; and
  (c) thereafter adding to the maintained slurry sufficient colloidal silica to render the slurry adhesive.

* * * * *